US012571770B2

(12) United States Patent
Bouaoua

(10) Patent No.: US 12,571,770 B2
(45) Date of Patent: Mar. 10, 2026

(54) ACOUSTIC DETECTION OF DEFECTS IN A PIPELINE

(71) Applicant: ROSEN SWISS AG, Stans (CH)

(72) Inventor: Nourreddine Bouaoua, Karlsruhe (DE)

(73) Assignee: Rosen IP AG, Stans (CH)

( * ) Notice: Subject to any disclaimer, the term of this patent is extended or adjusted under 35 U.S.C. 154(b) by 559 days.

(21) Appl. No.: 17/790,113

(22) PCT Filed: Jan. 6, 2021

(86) PCT No.: PCT/EP2021/050124
§ 371 (c)(1),
(2) Date: Jun. 29, 2022

(87) PCT Pub. No.: WO2021/140117
PCT Pub. Date: Jul. 15, 2021

(65) Prior Publication Data
US 2023/0049260 A1      Feb. 16, 2023

(30) Foreign Application Priority Data

Jan. 6, 2020    (BE) .................................. 2020/5003

(51) Int. Cl.
*G01N 29/11*        (2006.01)
*G01F 1/74*         (2006.01)
*G01N 29/04*        (2006.01)
*G01N 29/12*        (2006.01)

(52) U.S. Cl.
CPC ............. *G01N 29/11* (2013.01); *G01N 29/04* (2013.01); *G01N 29/046* (2013.01); *G01N 29/12* (2013.01);
(Continued)

(58) Field of Classification Search
CPC ................. G01N 29/11; G01N 29/046; G01N 2291/023; G01N 2291/0258;
(Continued)

(56) References Cited

U.S. PATENT DOCUMENTS 4,909,091 A * 3/1990 Ellmann ................ G01N 17/00
                                                    73/865.8
4,953,147 A * 8/1990 Cobb ..................... G01N 29/46
                                                    73/598
(Continued)

FOREIGN PATENT DOCUMENTS

DE          41 41 123 C1      3/1993
DE    10 2018 109 574 A1    10/2019
(Continued)

OTHER PUBLICATIONS

Machine Translation of JP 2001226707 A1 (Year: 2001).*
(Continued)

*Primary Examiner* — Peter J Macchiarolo
*Assistant Examiner* — Monica S Young
(74) *Attorney, Agent, or Firm* — Patent Technologies, LLC; Robert D. Gunderman, Jr.

(57)            ABSTRACT

The invention relates to an acoustic sensor system (1) for detecting a defect (2) of a pipeline wall (3), having: at least one transmitter unit (4) which is configured to emit ultrasound in the direction of a pipeline wall (3) and detect an ultrasound echo reflected by the pipeline wall (3); and a control unit (5) which is connected to the at least one transmitter unit (4) for signaling purposes and which is configured to detect a defect (2) of the pipeline wall (3) using a present change in the ultrasound echo. The invention additionally relates to an in-line inspection device comprising the sensor system (1), to a method for detecting a defect (2) in a pipeline wall (3), to a computer program, to a data carrier signal, and to a data storage unit.

18 Claims, 3 Drawing Sheets

(52) U.S. Cl.
CPC .......... *G01F 1/74* (2013.01); *G01N 2291/023* (2013.01); *G01N 2291/0258* (2013.01); *G01N 2291/104* (2013.01)

(58) Field of Classification Search
CPC .. G01N 2291/104; G01N 15/06; G01N 29/04; G01N 2291/02854; G01N 2291/044; G01N 2291/101; G01N 2291/102; G01N 2291/2636; G01N 29/12; G01N 29/46; G01N 29/043; G01F 1/74; G06F 17/14
USPC ......... 73/597, 598, 599, 600, 627, 628, 629, 73/630
See application file for complete search history.

(56) References Cited

U.S. PATENT DOCUMENTS

| | | | |
|---|---|---|---|
| 5,460,046 A | 10/1995 | Maltby et al. | |
| 2004/0074305 A1 | 4/2004 | Dust | |

| | | | | |
|---|---|---|---|---|
| 2014/0373631 A1* | 12/2014 | Davis | ..................... | G01N 29/44 73/627 |
| 2015/0068311 A1* | 3/2015 | Tanaka | ................... | G01N 17/00 73/629 |
| 2023/0042853 A1* | 2/2023 | Bouaoua | ........... | G01N 29/4454 |

FOREIGN PATENT DOCUMENTS

| | | | | |
|---|---|---|---|---|
| EP | 1 333 277 A2 | 8/2003 | | |
| JP | 2001226707 A * | 8/2001 | ............. | G01N 29/11 |
| JP | 2008 151 705 A | 3/2008 | | |
| WO | WO 92/10746 | 6/1992 | | |

OTHER PUBLICATIONS

Shoupeng et al., Quadrature demodulation based circuit implementation of pulse stream . . . , Meas. Sci. Technol., Jan. 17, 2017, pp. 1-10, 035005, IOP Publishing Ltd, UK.

* cited by examiner

ACOUSTIC DETECTION OF DEFECTS IN A PIPELINE

TECHNICAL FIELD

The present invention relates to an acoustic sensor system for detecting defects in a pipeline wall.

Further, the present invention relates to an inline inspection device comprising the acoustic sensor system.

Further, the present invention relates to a method for detecting defects in a pipeline wall.

Further, the present invention relates to a computer program comprising instructions which, when the computer program is executed by a computer, cause the computer to execute steps of the method.

Further, the present invention relates to a data carrier signal that transmits the computer program.

Further, the present invention relates to a computer-readable medium comprising instructions which, when executed by a computer, cause the computer to execute steps of the method.

BACKGROUND OF THE INVENTION

Known sensors for detecting defects, such as cracks, in pipeline walls are restricted in their detection characteristics to specific defect sizes. When increasing the sensitivity, complex configurations and correction methods are necessary in order to achieve sufficient accuracy in the detection of the defects.

DESCRIPTION OF THE INVENTION

Based on this situation, it is an object of the present invention to provide an improved sensor system for defect detection of a pipeline wall, an improved inline inspection device, an improved method for defect detection of a pipeline wall, an improved computer program, an improved data carrier signal, and an improved computer-readable medium.

In particular, it is intended to simplify a configuration while increasing the sensitivity so that, for example, defects with smaller dimensions are detected.

The object of the invention is achieved by the features of the independent claims. Advantageous embodiments are provided in the dependent claims. Where technically possible, the teachings of the dependent claims may be combined arbitrarily with the teachings of the independent claims and the dependent claims.

According to the invention, thus, an acoustic sensor system for detecting a defect in a pipeline wall is provided. The sensor system comprises at least one transceiver unit configured to emit ultrasound in the direction of the pipeline wall and to detect an ultrasound echo reflected from the pipeline wall, and a control unit signally connected to the at least one transceiver unit and configured to detect the defects of the pipeline wall based on an occurring change in the ultrasound echo.

According to the invention, moreover, an inline inspection device (ILI) for inspecting a pipeline wall is provided, comprising at least one acoustic sensor system according to the invention or according to any one of the advantageous embodiments described below.

According to the invention, furthermore, a method for detecting a defect of a pipeline wall is provided. The method comprises the following steps: operating at least one transceiver unit to emit ultrasound toward the pipeline wall and to detect an ultrasound echo reflected from the pipeline wall;

and operating a control unit signally connected to the at least one transceiver unit for detecting the defect of the pipeline wall based on an occurring change in the ultrasound echo. The method preferably comprises steps corresponding to features of the sensor system according to any one of the advantageous embodiments described below.

It is preferred that the sequence of the aforementioned method steps may be varied, unless technically required in the aforementioned sequence.

According to the invention, further a computer program comprising instructions is provided which, when the computer program is executed by a computer, cause the computer to carry out a previously described method. A computer program is a collection of instructions for executing a particular task, designed to solve a particular class of problems. The instructions of a program are designed to be executed by a computer, wherein it is required that a computer is able to execute programs in order to function.

According to the invention, further a data carrier signal is provided that transmits the computer program described above.

According to the invention, furthermore, a computer-readable medium comprising instructions is provided which, when executed by a computer, cause the computer to carry out a previously described method.

The basic idea of the invention and individual aspects of the claimed subject matter of the invention are explained below, and preferred modified embodiments of the invention are further described below. Explanations, in particular concerning advantages and definitions of features, are basically descriptive and preferred, but not limiting examples. Where an explanation is limiting, this is expressly mentioned.

Thus, the basic idea of the present invention is to use ultrasonic sensors to detect defects. In particular, defects in the form of corrosion, dents and cracks can be detected. The cracks can be of any shape. For example, cracks extending at an angle to the ultrasonic sensors can be detected. In addition, the size and shape of cracks of various shapes, such as: circular cracks, angled cracks, or slanted cracks can be detected. In this case, it is not necessary to specifically configure the system with respect to the different crack shapes. Furthermore, the geometry of the pipeline can be determined. Angled beam probes are not required.

When detecting defects, it is taken into account that a large part of the ultrasonic echo signal can be detected by the transceiver unit due to reflection from an intact inner wall of the pipeline. In case of corrosion of the inner wall, a change of the signal corresponding to a change of the ultrasonic echo is detectable at the transceiver unit. Surprisingly, it has been found that a single transceiver unit is sufficient for the sensor system to reliably detect corrosion. No complex setup is necessary. In other words, a single transceiver unit can initially emit ultrasound via a beam exit surface. The transceiver unit can detect the ultrasonic echo via its beam exit surface, which then corresponds to its beam entrance surface. In the case of installation of the sensor system in an inline inspection device (ILI), the single transceiver unit per circle sector of a cross-sectional area of the pipeline is therefore sufficient to detect corrosion. Depending on the number of circle sectors into which the cross-sectional area is divided, a corresponding number of sensor systems is selected. However, only one transceiver unit is required per circle sector, from which defects are detected separately from other sensor units.

For the detection of corrosion, therefore, very little configuration effort is required, since it is not necessary to drive several transceiver units or to tap and evaluate signals from them. There is also little drive electronics that would have to be used in a sensor system or in an ILI. This allows particularly compact setups of sensor systems and also ILIs, in particular if they are to be used for the inspection of pipelines affected by corrosion. Multiple transceiver units can be used, for example, to increase the redundancy and thus the reliability of measurement results.

According to a modified embodiment of the invention, it is provided that a single transceiver unit forms an immersion normal beam probe; or multiple transceiver units form an immersion normal beam probe (immersion probe). In other words, the acoustic sensor system comprises immersion probes. In immersion testing, unlike manual testing in which a probe is brought into direct manual contact with a component, ultrasound is introduced into a component under test through a medium, such as water or oil, over a longer delay line. A normal beam probe is also referred to as an ultrasonic normal probe, a single transducer vertical probe, or a longitudinal wave probe. A normal beam probe comprises a piezoelectric transducer that generates mechanical voltage waves, and thus longitudinal waves, as a result of electrical excitation by voltage pulses.

Preferably, the acoustic sensor system is formed by one or more immersion probes. The transceiver unit(s) is/are configured to emit a normal beam. In particular, the transceiver unit(s) is/are adapted to exclusively emit a normal beam. In other words, each of the transceiver units is a normal beam probe. The transceiver units are to be aligned perpendicular to an inner surface of the pipeline during material inspection.

In particular, the acoustic sensor system comprising the immersion probes is part of an ILI that moves inside a pipeline in order to detect cracks and corrosion at an inner or outer surface of the pipeline. In particular, the immersion normal beam probes are used for automated inspection for detects.

According to a modified embodiment of the invention, it is provided that the control unit is configured to drive at least a first transceiver unit of the sensor system, for emitting ultrasound towards the pipeline wall and for detecting an ultrasound echo reflected from the pipeline wall; temporarily drive at least one second transceiver unit of the sensor system for detecting the ultrasound echo reflected from the pipeline wall; and detect the defect of the pipeline wall based on an occurring change of the ultrasound echo.

In this context, the term "first transceiver unit" or "second transceiver unit" refers to the type of driving. The second transceiver unit is only driven temporarily.

In other words, advantageously two transceiver units are already sufficient for reliably detecting cracks. The use of the second transceiver unit only temporarily for detecting ultrasonic echoes and not for emitting ultrasound has the advantage that the second transceiver unit is not applied with a voltage in order to emit an ultrasonic signal. This has the advantage of significantly improving the signal-to-noise ratio, which allows for an improved sensitivity of defect detection, while also significantly reducing a configuration effort due to filtering of detected signals. More than two transceiver units could be used to improve the detection reliability.

Advantageously, ultrasonic echo signals are evaluated, which are generated or detected by only driving the first transceiver unit, or by driving the first transceiver unit and the second transceiver unit. Here, it is taken into account that a large part of the ultrasonic echo signal can be detected by the first transceiver unit by reflection from an intact inner wall of the pipeline. In case of corrosion of the inner wall, a change of the signal corresponding to a change of the ultrasonic echo is detectable at the first transceiver unit. In this case, the second transceiver unit does not need to be driven in order to detect ultrasonic echoes. Even if the first and the second transceiver units are each driven by the control unit, a change in signal can be detected at the first transceiver unit and at the second transceiver unit. A crack can be detected in this case. In the case that there is a crack in the pipeline, a signal change is detected. In the case of particularly small cracks, these can advantageously already be detected by the second transceiver unit. When a crack occurs, part of the ultrasound is blocked by the crack. Part of the ultrasound is reflected by the crack. In case of localization of the crack between ultrasound exit and entrance surfaces of the emitting transceiver unit and the detecting transceiver unit, a strength of the detected signal of the ultrasound echo decreases. In case of approach of emitting and reflecting transceiver unit to the crack, a strength of the signal increases compared to a signal emitted through an intact inner wall of the pipeline, which is then detected. Transceiver units operating in the aforementioned ultrasonic frequency range are particularly suitable for corrosion and crack detection in a pipeline. Here, there is no restriction in the detection of the depth of the cracks and also the measurement of deep cracks. Furthermore, detachments of coatings of the pipeline walls can be detected at the pipelines. Preferably, the transceiver units are aligned with respect to the inner pipeline wall in such a way that the ultrasound impinges on the surface of the inner pipeline wall approximately corresponding to a normal beam.

According to a modified embodiment of the invention, it is provided that at least one transceiver unit is configured for emitting and detecting low-frequency ultrasound, wherein an amount of a wavelength of the low-frequency ultrasound is greater than/equal to an amount of a wall thickness of the pipeline wall. In particular, the amount of the wavelength of the low-frequency ultrasound is related to the amount of the wall thickness WT of the pipeline wall according to $2 \cdot WT/n$, where n is a natural number. The transceiver unit(s) operating at low frequency is/are thus used for low frequency ultrasonic testing, or LFUT. It is conceivable that both the transceiver unit(s) permanently driven for emission and detection and the transceiver unit(s) temporarily driven for detection are designed to emit and/or detect low frequency ultrasound. Low frequency ultrasound covers a frequency range of 100 kHz to 1.5 MHz. An operation in a low-frequency range of 500 KHz or 600 KHz is preferred. In particular, the transceiver unit(s) is/are designed as a broad-band sensor. The pipelines can carry gas as well as water or oil. Cracks with a depth of 2 mm and larger can be detected and measured. The depth of a crack is a distance along a measured wall thickness between the inner wall of the pipeline and an outer wall of the pipeline. Contaminated pipelines or pipelines with wax on the inner walls can be examined. Even pipelines with thick internal coatings can be inspected for defects.

According to a modified embodiment of the invention it is provided that at least one transceiver unit is designed to emit and detect high frequency ultrasound. The transceiver unit(s) operating at high frequency is/are thus used for high frequency ultrasonic testing (HFUT). It is conceivable that both the transceiver unit(s) permanently driven for emission and detection and the transceiver unit(s) temporarily driven for detection are designed to emit and/or detect high frequency ultrasound. High-frequency ultrasound covers a frequency range in the order of magnitude of megahertz starting from a frequency of more than 1.5 MHz. The pipelines may carry gas, water or oil. Cracks with a depth of 0.5 mm and larger can be detected and measured. Furthermore, very small corrosion spots can be detected, for example pitting corrosion. In particular, when using transceiver units with high-frequency ultrasound, a mathematical model is used to determine absolute sizes of defects.

According to a modified embodiment of the invention, it is provided that the sensor system comprises at least one transceiver unit designed to emit and detect low-frequency ultrasound and at least one transceiver unit designed to emit and detect high-frequency ultrasound. This makes the sensor system universally applicable for the aforementioned fields of application, by use of both frequency spectra.

According to a modified embodiment of the invention, it is provided that, in particular when only the first transceiver unit is driven or the first and the second transceiver unit are driven, the control unit is configured to evaluate the change of the ultrasonic echo corresponding to a change of an ultrasonic echo divergence generated by corrosion in order to detect corrosion. The ultrasonic echo divergence is taken into account assuming that both emitted ultrasound and an echo approximately propagate radially. The ultrasonic echo divergence corresponds to a beam cross section of an ultrasonic echo beam scattered at the pipeline wall with respect to a certain distance, i.e. a kind of opening angle of the ultrasonic beam of the ultrasonic echo. The corrosion detection hereby becomes particularly reliable due to a redundant determinability of corrosion-related defects.

According to a modified embodiment of the invention, it is provided that, in particular when only driving the first transceiver unit in a pitch catch mode or driving the first and the second transceiver unit respectively in a pitch catch mode, the control unit is configured to evaluate the change of the ultrasonic echo corresponding to a change of an ultrasonic echo divergence generated by corrosion in order to detect corrosion.

According to a modified embodiment of the invention, it is provided that, in particular when only driving the first transceiver unit in a pulse echo mode or driving the first and the second transceiver unit respectively in a pulse echo mode, the control unit is configured to evaluate the change of the ultrasonic echo corresponding to a change of an ultrasonic echo divergence generated by corrosion in order to detect corrosion.

In other words, according to the two previously described modified embodiments of the pitch catch mode (PC mode) or the pulse echo mode (PE mode), corrosion detection is carried out from analysis of the received ultrasonic waves from the PE mode or the PC mode. In the so-called pulse echo mode (PE mode), the transceiver unit(s) emits (emit) ultrasound and detects (detect) an ultrasonic echo. In the PE mode, the same transceiver units that emit the ultrasound can also detect it. In particular, the driving of the at least one first and the at least one second transceiver unit comprises, in particular corresponds to, a combination of the PE mode and/or the so-called pitch catch mode or PC mode, in which one/a plurality of transceiver unit(s) emits/emit ultrasound and one/a plurality of other transceiver unit(s) detects/detect an ultrasonic echo.

According to a modified embodiment of the invention, it is provided that, in particular in case of temporarily driving the second transceiver unit, the control unit is configured to determine a wall thickness of the pipeline wall based on a difference between an inner wall echo time and an outer wall echo time. An inner wall echo is an echo which is reflected from a pipeline side facing the transceiver in the direction of the transceiver. An outer wall echo is an echo which is reflected in the direction of the transceiver from a pipeline side facing away from the transceiver and forming the outer shell of the pipeline. The advantageous embodiment has the advantage that a wall thickness of the pipeline can be determined from the detected ultrasonic echo without much filtering of a signal. Advantageously, such a determination method is used when a transceiver unit operating at high-frequency is used.

According to a modified embodiment of the invention it is provided that, in particular in case of temporarily driving the second transceiver unit, the control unit is configured to determine a wall thickness of the pipeline wall based on at least two resonance frequencies of the outer wall echo or based on at least one resonance frequency of the outer wall echo and a duration of the at least one resonance frequency of the outer wall echo. The resonance frequency is the frequency at which an amplitude of the pipeline wall capable of oscillation is greater than as in the case of excitation by adjacent frequencies (amplitude resonance). In particular, in addition to the resonance frequencies, their corresponding harmonics are additionally used. With advantage such a determination method by use of the resonance frequencies is used when using a transceiver unit operating at low frequencies.

According to a modified embodiment of the invention, it is provided that, in particular in case of temporarily driving the second transceiver unit, the control unit is configured to determine a wall thickness of the pipeline wall based on at least one outer wall echo time and at least one period duration of an outer wall echo at this at least one outer wall echo time. The period duration is the Fourier transform of a frequency of the outer wall echo. This method is advantageously applicable for the evaluation of signals of transceiver units operated at high-frequency or at low-frequency. The additional use of the outer wall echo times is in particular conceived in order to improve a signal-to-noise ratio. According to a particularly advantageous embodiment of the invention, it is provided that the control unit is configured to determine a wall thickness of the pipeline wall based on an outer wall echo time and at least one period duration of an outer wall echo at this outer wall echo time point of an ultrasonic signal transformed by means of a second degree fast Fourier transform (FFT).

According to a modified embodiment of the invention, it is provided that, in particular in case of temporarily driving the second transceiver unit, the control unit is configured to perform crack detection and crack size determination based on amplitudes/integrals of components of an unprocessed ultrasound signal, a first degree fourier transformed ultrasound signal, or a second degree fourier transformed ultrasound signal. In particular, the signal component is an outer wall echo and/or (a) resonance frequency.

According to a modified embodiment of the invention, it is preferably provided that, in particular in case of temporarily driving the second transceiver unit, the control unit is configured to perform a crack detection and a crack size determination based on at least one amplitude of at least one resonance frequency and/or at least one amplitude of an outer wall echo. According to a modified embodiment of the invention, it is preferably provided that, in particular in case of temporarily driving the second transceiver unit, the control unit is configured to perform a crack detection and a crack size determination based on amplitudes of resonance frequencies and/or an amplitude of an outer wall echo. According to a particularly advantageous embodiment of the invention, it is provided that, in particular in the case of temporarily driving the second transceiver unit, the control unit is configured to perform crack detection and crack size determination based on amplitudes of resonance frequencies and/or amplitudes of an outer wall echo. According to a particularly advantageous embodiment of the invention, it is provided that the control unit is configured to perform crack detection and crack size determination based on amplitudes of resonance frequencies in a frequency domain and/or an amplitude(s) of an outer wall echo of an ultrasonic signal transformed by second degree FFT. Advantageously, such a determination method is used when using one/a plurality of transceiver unit(s) operating at low-frequency or one/a plurality of transceiver unit(s) operating at high-frequency.

According to a modified embodiment, the control unit is configured to perform crack detection and crack size determination for signals of low-frequency ultrasound based on at least one amplitude of at least one resonance frequency. According to a modified embodiment, the control unit is configured to perform crack detection and crack size determination for signals of high-frequency ultrasound based on at least one amplitude of at least one outer wall echo, in particular based on a periodicity/repetition rate of at least one outer wall echo. In the case of a detection of cracks based on a high-frequency signal, this signal is in particular Fourier transformed.

According to a modified embodiment of the invention, it is provided that the control unit is configured to detect cracks in an order of magnitude of 2 mm in a high-frequency ultrasonic signal during an evaluation of raw data of a signal (raw signal) in which an amplitude is plotted against time. Here, in particular, a linear evaluation of the raw signal is performed for high-frequency signals and a non-linear evaluation is performed for low-frequency signals.

According to a modified embodiment of the invention, it is provided that the control unit is configured to detect cracks in an order of magnitude of 2 mm for a high-frequency ultrasonic signal when evaluating a first degree fourier transform of a signal. Further, the control unit is configured to detect a crack depth based on a magnitude of amplitude/integral of signal components. Further, the control unit is configured to detect a crack based on a mode in a frequency range in the order of three times a shear wave or 1.6 times a longitudinal mode.

According to a modified embodiment of the invention, it is provided that the control unit is configured to detect cracks in the order of 2 mm for a high frequency ultrasonic signal when evaluating a second degree fourier transform of a signal. Further, the control unit is configured to detect a crack depth based on a magnitude of amplitude/integral of signal components. Further, the control unit is configured to determine a crack size at a signal portion of high frequency ultrasound based on at least one of an amplitude and an integral of at least one outer wall echo.

According to a modified embodiment of the invention, it is provided that an attenuation of the ultrasonic echo is proportional to a depth of the defect. Due to the linear relationship a crack depth can be particularly easily determined based on the amplitude.

According to a modified embodiment of the invention, it is provided that the transceiver unit is configured to emit ultrasound or to detect ultrasound in a phase-dependent manner. Such a configuration of the transceiver unit is particularly advantageous for sensor systems which have to be designed compactly. For example, the first transceiver unit can be designed as a phase-dependent ultrasound emitting and detecting physical unit.

According to a modified embodiment of the invention, a single transceiver unit configured to detect reflected ultrasound and a plurality of transceiver units arranged around the single transceiver unit, each configured to emit ultrasound, are provided in the sensor system. The arrangement of the transceiver units with respect to each other is defined with respect to an ultrasound entrance surface or an ultrasound exit surface. The arrangement of the transceiver units is such that the ultrasound exit or entrance surfaces of all transceiver units lie in a common plane. Surprisingly, it has been found that a particularly good sensitivity for smaller cracks can be achieved when using a single, in particular centrally arranged, transceiver unit for detecting the ultrasonic echoes. If the single transceiver unit is arranged centrally, the sensitivity is particularly good. The surrounding transceiver units, which emit ultrasound, thus emit a particularly large amount of energy, which can propagate through the gas in a pipeline and penetrate the pipeline wall, so that, moreover, particularly good measurement signals can be achieved. Furthermore, the effects of misalignments of the sensor system can be compensated with advantage.

According to a particularly advantageous embodiment of the invention, it is provided that the second transceiver unit is formed by a one-piece ring at its ultrasonic exit surface and an ultrasonic entrance surface of the first transceiver unit is arranged inside the ring, preferably concentrically. A one-piece configuration of the ring means in particular a closed one-piece ultrasonic exit surface of the second transceiver unit. Here, it has been found that the effects described for the previous embodiment occur even more pronounced in this particularly advantageous embodiment. According to a further particularly preferred embodiment, the second transceiver unit is arranged concentrically to the first transceiver unit in such a way that the first and the second transceiver unit have a common circle center. In particular, the first transceiver unit is circular in shape. In the above-described embodiments, it is possible in particular to obtain a good signal-to-noise ratio at a deviation of the alignment of a low-frequency ultrasonic beam to the pipeline wall of 2 degrees from a surface normal of a pipeline wall at a wall thickness of more than 30 mm. For thinner wall thicknesses, even greater deviations in alignment are possible, while still maintaining a sufficient signal-to-noise ratio. With high-frequency ultrasound, a good signal-to-noise ratio can be achieved with a deviation of one degree from the surface normal. The latter is especially true for wall thicknesses of 30 mm and more. For smaller wall thicknesses, a good signal-to-noise ratio can also be achieved with high-frequency ultrasound with a deviation of more than one degree from the surface normal.

According to a modified embodiment of the invention, the sensor system comprises exactly two transceiver units, of which the first transceiver unit is configured to detect reflected ultrasound and the second transceiver unit is configured to emit ultrasound. This is a particularly compact embodiment of the sensor system, in which both detection of corrosion and detection of cracks or other types of defects are possible.

According to a modified embodiment of the invention, the sensor system comprises a plurality of transceiver units, wherein ultrasonic exit and entrance surfaces of the transceiver units are arranged circularly. A circular arrangement means, for example, that the transceiver units are arranged with their respective center of the ultrasonic exit or entrance surfaces on a fictional circle. In this case, a transceiver unit that is only designed for detection can be arranged in the center of a circle. In particular, the plurality of transceiver units in which the ultrasound exit and entrance surfaces are arranged in a circular manner is a transducer array rather than a phased array. With a circular arrangement of the ultrasonic exit/entrance surfaces, good signal-to-noise ratios can be achieved with advantage, especially in gas-filled pipelines. This facilitates the determination of absolute sizes of the defects and smaller defects can be detected particularly well.

According to a particularly modified embodiment of the invention, it is provided that the at least one transceiver unit is configured to be excited via high voltage chirp and/or a high voltage spike. The high voltage for excitation of the at least one transceiver unit has a frequency of 200 KHz to 1200 KHz. High voltage corresponds here to a voltage in a range of 10 volts to 250 volts. Here it has been found advantageously that particularly good signal-to-noise ratios can be achieved.

According to a particularly advantageous embodiment of the invention, the following method steps are provided:

driving at least one first transceiver unit of the sensor system for emitting ultrasound in the direction of the pipeline wall and for detecting an ultrasound echo reflected by the pipeline wall;

temporarily driving at least one second transceiver unit of the sensor system for detecting the ultrasound echo reflected by the pipeline wall; and detecting the defect of the pipeline wall based on an occurring change of the ultrasonic echo. In particular, driving the at least one first transceiver unit comprises, in particular corresponds to, a so-called pulse echo mode (PE mode), in which the transceiver unit(s) emits (emit) ultrasound and detect an ultrasonic echo. In the PE mode, the same transceiver units that emit the ultrasound can also detect it. In particular, driving of the at least one first and the at least one second transceiver unit comprises, in particular corresponds to, a combination of the PE mode and/or the so-called "pitch catch mode" (PC mode), in which one/a plurality of transceiver unit(s) emits/emit ultrasound and one/a plurality of other transceiver unit(s) detects/detect an ultrasonic echo. With the aforementioned method, it is possible to detect corrosion as well as cracks or other defects. Here, a particularly high sensitivity can be achieved in that no voltage is applied to the second transceiver unit in order to emit ultrasound, but the second transceiver unit is merely used to detect ultrasonic echoes.

BRIEF DESCRIPTION OF THE DRAWINGS

In the following, the invention is explained in more detail with reference to the accompanying drawings based on preferred exemplary embodiments. The term Figure is abbreviated in the drawings as Fig; In the drawings.

DETAILED DESCRIPTION OF THE EXEMPLARY EMBODIMENTS

The described exemplary embodiments are merely examples that can be modified and/or supplemented in a variety of ways within the scope of the claims. Each feature described for a particular exemplary embodiment can be used independently or in combination with other features in any other exemplary embodiment. Any feature described for an exemplary embodiment of a particular claim category may also be used in a corresponding manner in an exemplary embodiment of another claim category.

Figures 1A, 1B:
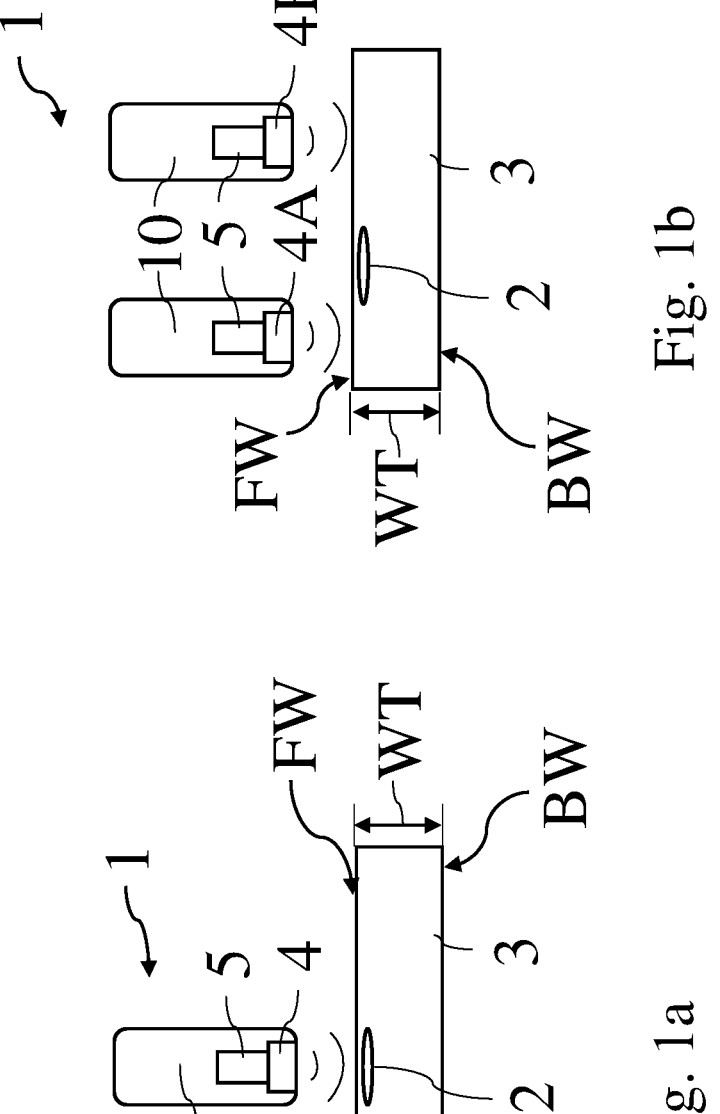
FIG. 1a is a schematic view of a sensor system according to a first embodiment.
FIG. 1b is a schematic view of a sensor system according to a second embodiment.

FIG. 1a shows a schematic view of a sensor system 1 according to a first embodiment. The sensor system 1 is suitable for detecting defects 2 of a pipeline wall 3. The pipeline wall 3 is made of metal, for example of steel. The sensor system 1 comprises a transceiver unit 4 and a control unit 5. The transceiver unit 4 and the control unit 5 are integrated in a common physical unit 10. The transceiver unit 4 is configured to emit ultrasound and receive ultrasound, which is reflected in the form of ultrasonic echoes from a pipeline wall 3.

The transceiver unit 4 is configured to emit and detect high-frequency ultrasound. Here, the transceiver unit 4 emits high-frequency ultrasound with a frequency in a range from 3 to 5 MHz. Thus, the sensor system 1 detects, for example, corrosion or detachment of coatings in liquid-carrying pipelines, which are, for example, oil-carrying or water-carrying.

Alternatively, the transceiver unit 4 is designed to emit and detect low-frequency ultrasound. Here, the transceiver unit 4 emits low-frequency ultrasound with a frequency in a range from 500 to 600 KHz. Thus, the sensor system 1 detects, for example, corrosion or detachment of coatings in gas- or liquid-carrying pipelines. For example, gas with a pressure of 107 Pa may be present in the pipeline.

In the following, the reference signs 4A, 4B, 4a, 4b are also assigned for the transceiver unit 4. The latter reference signs refer to a structural form of the transceiver units 4, 4A, 4B, 4a, 4b, wherein all transceiver units 4, 4A, 4B, 4a, 4b can be driven as a first or as a second transceiver unit.

FIG. 1b shows a schematic view of a sensor system 1 according to a second embodiment. The sensor system 1 of the exemplary embodiment of FIG. 1b is suitable for detecting corrosion, cracks and detachments of coatings at or in a pipeline wall 3, which is liquid-carrying.

The sensor system 1 comprises two physical units 10, which are spatially separated from each other. The physical units 10 can be fixed to each other at a distance of, for example, 5 cm, or be designed to be movable relative to each other. The physical units 10 of the sensor system 1 each comprise a control unit 5 and a transceiver unit 4A, 4B. Alternatively, according to an embodiment not shown, a common control unit 5 may be provided for both transceiver units 4A, 4B. The control unit 5 needs not be integrated within one of the physical units 10 of the sensor system 1. In the embodiment two physical units 10 respectively comprising a transceiver unit 4A, 4B are shown. However, more than these two physical units 10 comprising a respective transceiver unit can be provided.

The transceiver units 4A, 4B are driven differently by the control unit 5: The first transceiver unit 4A is driven to operate in a pulse echo mode (PE mode), and to operate in a pitch catch mode (PC mode). In addition, the first transceiver unit can be driven simultaneously in the pitch catch mode and in the PE mode (see also explanations with respect to the flow chart in FIG. 3). The PC mode is also abbreviated as "PC" below and the PE mode is also abbreviated as "PE" below. In both modes PE, PC described above, the first transceiver unit 4A emits ultrasound towards the pipeline wall 3 and detects ultrasonic echoes reflected from the pipeline wall 3. The second transceiver unit 4B is driven in the PC mode (see also explanations with respect to FIG. 3) to detect the ultrasonic echo reflected from the pipeline wall 3.

The control unit 5 is operated in both modes PE and PC. The control unit 5 evaluates signals corresponding to the ultrasonic echoes in order to detect a defect 2 of the pipeline wall 3 based on a change in the ultrasonic echo occurring in the PE, PC mode.

When the pipeline wall 3 is intact, the first transceiver unit 4A detects in the PE mode the majority of the ultrasound emitted normally onto the pipeline wall surface, which is reflected as an echo. A minor portion of the ultrasonic echo is detected by the second transceiver unit 4B in the PC mode. In the case of corrosion, the first transceiver unit 4A detects a significant change in the ultrasonic echo in the PE mode. The second transceiver unit 4B, too, detects a change in the ultrasonic echo in the PC mode. The detected signal changes in the PE and PC modes are each sufficient to determine that corrosion is present. In the case of a crack in the pipeline wall 3, for example in the form of a linear defect, a change in the ultrasonic echo is detected in the PC mode. In detecting the change in the ultrasonic echo, it is taken into account that an ultrasonic echo generated by ultrasound emitted from the transceiver unit(s) is partially suppressed by the crack, and is partially generated by ultrasound reflected at the crack. In the case where the crack is located between the transceiver unit 4 emitting the ultrasound and the transceiver unit 4 detecting the ultrasound, the detected signal of the ultrasonic echo is reduced. In the case where the emitting and detecting transceiver units 4 together approach the crack, a detected ultrasonic echo signal increases compared to an ultrasonic echo signal generated at an intact pipeline wall surface. The transceiver units 4, 4A, 4B may include a low noise, high gain amplifier (not shown). This can be used in both modes PE, PC.

Figures 2A, 2B, 2C:
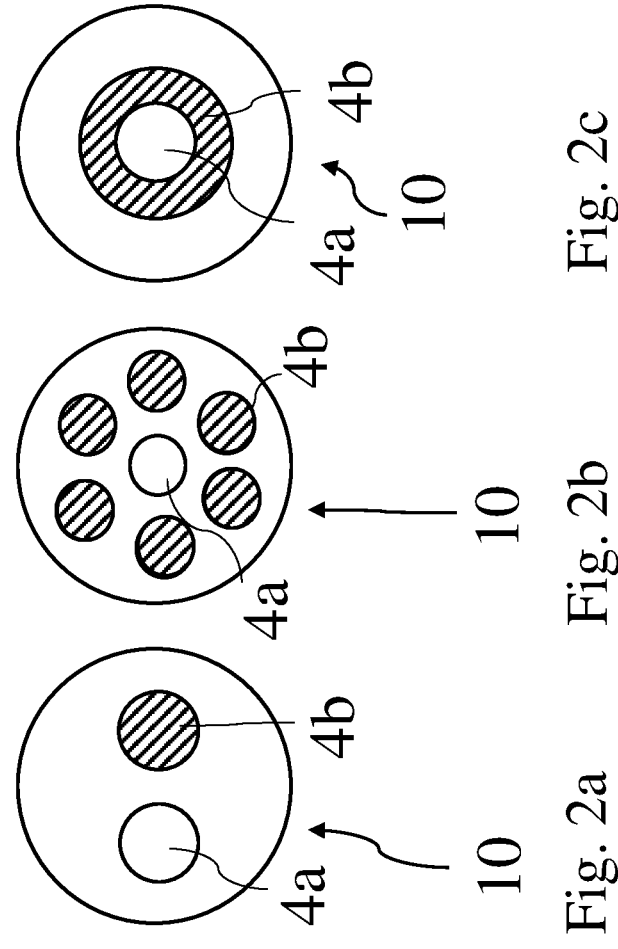
FIG. 2a is a schematic top view of an ultrasonic entrance/exit surface of a physical unit of a sensor system according to a third embodiment.
FIG. 2b is a schematic top view of an ultrasonic entrance/exit surface of a physical unit of a sensor system according to a fourth embodiment.
FIG. 2c is a schematic top view of an ultrasonic entrance/exit surface of a physical unit of a sensor system according to a fifth embodiment.

The transceiver units 4, 4A, 4B of the embodiments described above and below are piezoelectric broadband transceivers. The physical units 10 of the sensor system 1 may, as an alternative to an embodiment comprising one transceiver unit 4A, 4B per physical unit 10, each be configured in accordance with one of the exemplary embodiments of FIGS. 2a to 2c. FIGS. 2a to 2c each show a schematic top view of an ultrasonic entrance/exit surface of a physical unit 10 of a sensor system 1 according to a third to fifth embodiment. In these exemplary embodiments, ultrasound emitting and ultrasound detecting transceiver units 4a, 4b are integrated in the physical unit 10. The transceiver units 4a, 4b can operate as a first or a second transceiver unit 4 depending on the operation mode in the PE mode or PC mode.

According to the embodiment shown in FIG. 2a, the physical unit 10 comprises an emitting transceiver unit 4b and a detecting transceiver unit 4a.

According to an exemplary embodiment of FIG. 2b, the physical unit 10 comprises a plurality of ultrasound emitting transceiver units 4b and an ultrasound echoes detecting transceiver unit 4a arranged centrally with respect to the ultrasound emitting transceiver units 4b.

According to an exemplary embodiment shown in FIG. 2c, a physical unit 10 comprises a detecting transceiver unit

4a and an emitting transceiver unit 4b annularly surrounding the detecting transceiver unit 4a. In other words, the second transceiver unit 4b is formed by a one-piece ring at its ultrasound exit surface, and an ultrasound entrance surface of the first transceiver unit 4a is disposed inside the ring.

Alternatively or additionally, physical units 10 according to the exemplary embodiment of FIG. 2a or 2c are arranged to each other (circularly) in a configuration as shown in FIG. 2b. The number of detecting transceiver units 4a arranged in the center and/or of emitting transceiver units 4b arranged in the circle is adaptable as required according to a signal-to-noise ratio to be achieved, the characteristics of the pipeline and a size of the sensor system 1. The emitting transceiver units 4b may also be arranged in a plurality of circles of different diameters around the detecting transceiver unit(s) 4a. Alternatively to the above exemplary embodiments, the detecting transceiver units 4a are arranged in circles around one or more ultrasound emitting transceiver unit(s) 4b. This may be realized in one physical unit 10 or in multiple physical units 10 according to the principles described above.

According to one exemplary embodiment, the transceiver units 4, 4a, 4A, 4B, 4b emit or detect ultrasound in the high frequency range. According to an alternative exemplary embodiment, the transceiver units 4, 4a, 4A, 4B, 4b emit or detect ultrasound in the low-frequency range. Alternatively, the sensor system 1 comprises physical units 10 which emit or detect ultrasound in the high-frequency range and physical units 10 which emit or detect ultrasound in the low-frequency range.

Figure 3:
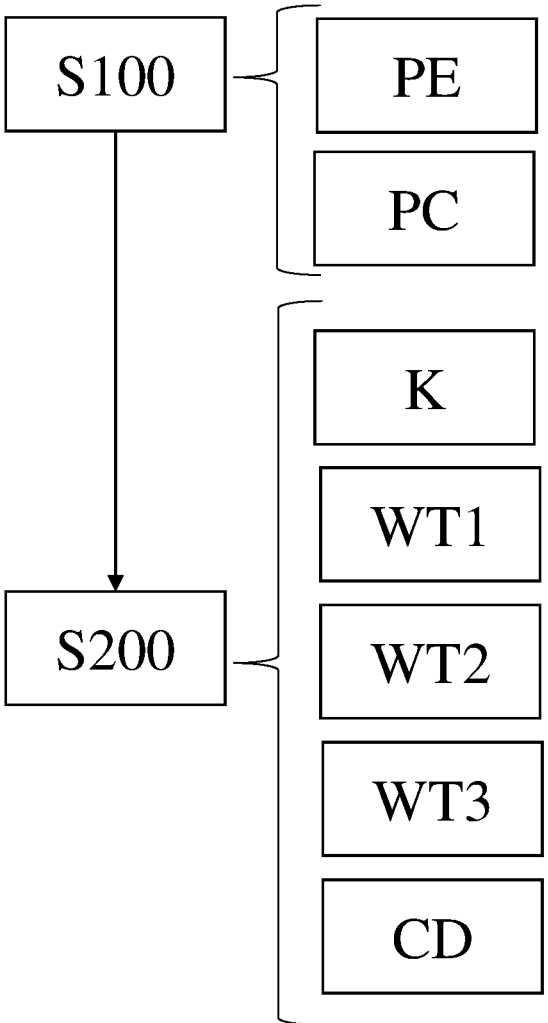
FIG. 3 is a flow chart of a method according to an embodiment.

A flow chart of a method for detecting a defect 2 and for characterizing a wall thickness WT of the pipeline wall 3 is shown in FIG. 3. The method comprises the following steps: According to a step "S100", operating at least one transceiver unit 4, 4a, 4A, 4b, 4B is implemented to emit ultrasound toward the pipeline wall 3 and detect an ultrasound echo reflected from the pipeline wall 3. According to a step "S200", operating of a control unit 5 signally connected to the at least one transceiver unit 4, 4a, 4A, 4b, 4B is implemented to detect a defect 2 of the pipeline wall 3 based on an occurring change of the ultrasonic echo.

Operating (S100) the transceiver unit 4, 4a, 4A, 4b, 4B may include both the PE mode and the PC mode. The PE mode is advantageous for detecting corrosion by use of one physical unit 10, see FIG. 1a, or when only one physical unit 10 is used in the sensor system 1 of the exemplary embodiment of FIG. 1b. In the PE mode, one of the transceiver units 4a, 4b of the exemplary embodiments of FIGS. 2a to 2c or the combinations of physical units described in this context can be operated, too.

The PC mode occurs in the context of operating at least two transceiver units 4a, 4A, 4b, 4B. These may, for example, be operated in separate physical units 10 (see FIG. 1b) or in one physical unit 10 (see FIGS. 2a and 2c and the explanations in this context) in the PC mode. As an example, the following method comprising the following steps may be used:

Step "S100" comprises operating at least a first transceiver unit 4, 4a, 4A, 4b, 4B according to the PE mode and according to the PC mode to emit ultrasound toward a pipeline wall 3 and to detect an ultrasound echo reflected from the pipeline wall 3. Further, operating at least one second transceiver unit 4, 4a, 4A, 4b, 4B in the PC mode is provided to detect the ultrasonic echo reflected from the pipeline wall 3.

Step "S200" comprises operating a control unit 5 signally connected to the transceiver units 4, 4a, 4A, 4b, 4B to detect a defect 2 of the pipeline wall 3 based on an occurring change in the ultrasonic echo.

In determining the wall thickness WT and characteristics of defects 2 of the pipeline wall 3, the control unit 5 utilizes the time course of a frequency signal which is output to the control unit 5 by the transceiver units 4, 4a, 4A, 4b, 4B. The frequency signal is evaluated either directly or after applying a Fourier transformation several times (either in a frequency domain or in a time domain).

When operating the control unit 5 (S200) to detect defects 2, various methods may be used:

The control unit 5 may use a method for detecting corrosion (indicated by "K"). To this end, the control unit 5 is configured to evaluate the change in the ultrasonic echo corresponding to a change in an ultrasonic echo divergence generated by corrosion in order to detect corrosion.

Alternatively or additionally, the control unit 5 is configured to carry out a method for determining the wall thickness WT (indicated by "WT1" in the flow chart). The method WT1 is carried out by the control unit 5 to evaluate data obtained from measurements by use of one/more transceiver units 4, 4a, 4A, 4b, 4B which emit high frequency ultrasound. The control unit 5 determines the wall thickness WT (see FIGS. 1a and 1b) of the pipeline wall 3 based on a difference between an inner wall echo time ($T_{FWE}$) and an outer wall echo time ($T_{BWE}$). The inner wall FW (see FIGS. 1a and 1b) is a surface of the pipeline wall 3 facing the transceiver unit 4, 4a, 4A, 4b, 4B. The outer wall BW (see FIGS. 1a and 1b) is a surface of the pipeline wall 3 facing away from the transceiver unit 4, 4a, 4A, 4b, 4B, which is outside the pipeline. A first detected inner wall echo may be used in determining the wall thickness WT. The wall thickness WT may alternatively or additionally be determined by use of a second or further detected inner wall echo. The wall thickness WT can then be derived from the following formula:

$$WT = \frac{C_{L2}(T_{BWE} - T_{FWE})}{2}$$

Here, $C_{L2}$ is the speed of sound in the pipeline wall.

Alternatively or additionally, the control unit 5 is configured to carry out a method for determining the wall thickness WT (indicated by "WT2" in the flow chart). The method WT2 is carried out by the control unit 5 to evaluate data obtained from measurements by use of one/a plurality of transceiver units 4, 4a, 4A, 4b, 4B emitting low frequency ultrasound. Here, the control unit 5 is configured to determine a wall thickness WT of the pipeline wall 3 based on resonance frequencies f1, f2, . . . fi of the outer wall echo. Here, the control unit 5 determines resonance frequencies f1, f2, . . . , fi of the outer wall echo in a frequency domain. The wall thickness WT then results from $$WT = \frac{C_{L2}}{2(f2 - f1)}$$

Here, $C_{L2}$ is the speed of sound in the pipeline wall. The resonance frequency f2 of the outer wall echo is the resonance frequency following in time the resonance frequency f1 of the outer wall echo. Alternatively or in addition to the frequencies f1 and f2, other resonance frequencies fi obtained from the Fourier transform can be used to determine the wall thickness WT.

The method of the control unit 5 described below is denoted by "WT3" in the flow chart. Accordingly, a signal-to-noise ratio may be improved by carrying out a second degree fourier transform on the detected signal. Such a Fourier transform may be carried out for signals from transceiver units 4, 4a, 4b, 4A, 4B operated both at high-frequency and at low-frequency. Here, a wall thickness WT is determined on the basis of a period duration T1, T2, . . . , Ti of the outer wall echo time $T_{BWE}$ of an ultrasonic signal transformed by means of a second degree fast Fourier transform (FFT). Here, preferably a maximum amplitude of the signal of the outer wall echo is used for determining the wall thickness. The wall thickness WT is then obtained, for example, taking into account a period duration T1 of the maximum amplitude of the outer wall echo signal:

$$WT = \frac{C_{L2}T1}{2}$$

Alternatively or additionally, the control unit 5 is configured to carry out a method for determining crack characteristics ("crack detection", abbreviated as "CD" in the flow chart). The method CD is carried out by the control unit 5 to evaluate data obtained from measurements by use of one/a plurality of transceiver units 4, 4a, 4A, 4b, 4B which emit low-frequency or high-frequency ultrasound. Here, the control unit 5 is configured to carry out crack detection and a crack size determination based on amplitudes from the resonance frequencies f1, f2, . . . fi and (an) amplitude(s) of an outer wall echo. In particular, the control unit 5 is configured to carry out crack detection and a crack size determination based on amplitudes of resonance frequencies f1, f2, . . . fi in a frequency domain and (an) amplitude(s) of an outer wall echo of an ultrasonic signal transformed by second degree FFT. In the aforementioned method of investigating crack characteristics, an attenuation of the ultrasound echo is proportional to a depth of the defect 2.

The aforementioned exemplary embodiments are suitable for wall thickness determination of pipelines with thicknesses from 6 mm to 30 mm. Other wall thicknesses WT are also conceivable.

LIST OF REFERENCE SYMBOLS 1 sensor system
2 defect
3 pipeline wall
4, 4a, 4b, 4A, 4B transceiver unit
5 control unit
10 physical unit
BW outer pipeline wall
CD crack characterization method
FW inner pipeline wall
PC PC mode
PE PE mode
WT wall thickness
WT1 first method for wall thickness determination
WT2 second method for wall thickness determination
WT3 third method for wall thickness determination
S100 operating at least one transceiver unit
S200 operating at least one control unit

The invention claimed is:
1. An acoustic sensor system (1) for detecting a defect (2) of a pipeline wall (3), comprising: at least one transceiver unit (4) configured to emit ultrasound toward the pipeline wall (3) and to detect an ultrasound echo reflected from the pipeline wall (3); and a control unit (5) signally connected to the at least one transceiver unit (4) and configured to detect the defect (2) of the pipeline wall (3) based on an occurring change in the ultrasonic echo; wherein the control unit (5) is configured to evaluate the change in the ultrasonic echo corresponding to an ultrasonic echo divergence generated by corrosion in order to detect corrosion; wherein the ultrasonic echo divergence corresponds to a beam cross section of an ultrasonic echo beam scattered at the pipeline wall with respect to an echo beam cross section distance created by an opening angle.

2. The acoustic sensor system according to claim 1, wherein the at least one transceiver unit (4) forms an immersion normal beam probe.

3. The acoustic sensor system (1) according to claim 1, wherein the control unit (5) is configured to:

drive at least a first transceiver unit (4) of the sensor system (1) for emitting ultrasound in the direction of the pipeline wall (3) and for detecting an ultrasound echo reflected by the pipeline wall (3);

temporarily drive at least a second transceiver unit (4) of the sensor system (1) for detecting the ultrasonic echo reflected from the pipeline wall (3); and detect the defect (2) of the pipeline wall (3) based on an occurring change of the ultrasonic echo.

4. The acoustic sensor system (1) according to claim 1, wherein at least one transceiver unit (4) is configured for emitting and detecting low-frequency ultrasound, wherein a wavelength of the low-frequency ultrasound is greater than/equal to a wall thickness (WT) of the pipeline wall (3).

5. The acoustic sensor system (1) according to claim 4, wherein the wavelength of the low-frequency ultrasound relates to the wall thickness (WT) of the pipeline wall (3) according to $2 \cdot WT/n$, wherein n is a natural number.

6. The acoustic sensor system (1) according to claim 1, wherein at least one transceiver unit (4) is configured to transmit and detect high-frequency ultrasound.

7. The acoustic sensor system (1) according to claim 1, wherein the control unit (5) is configured to determine a wall thickness (WT) of the pipeline wall (3) based on a difference between an inner wall echo time ($T_{FWE}$) and an outer wall echo time ($T_{BWE}$).

8. The acoustic sensor system (1) according to claim 1, wherein the control unit (5) is configured to determine a wall thickness (WT) of the pipeline wall (3) based on at least two resonance frequencies (f1, f2, . . . fi) of the outer wall echo or based on at least one resonance frequency (f1, f2, . . . fi) of the outer wall echo and a duration of the at least one resonance frequency (f1, f2, . . . fi) of the outer wall echo.

9. The acoustic sensor system (1) according to claim 1, wherein the control unit (5) is configured to determine a wall thickness (WT) of the pipeline wall (3) on the basis of at least one outer wall echo time ($T_{BWE}$) and at least one period duration (T1, T2, . . . Ti) of an outer wall echo at this at least one outer wall echo time ($T_{BWE}$).

10. The acoustic sensor system (1) according to claim 1, wherein the control unit (5) is configured to carry out crack detection and a crack size determination based on at least one amplitude of at least one resonance frequency (f1, f2, . . . fi) and/or at least one amplitude of an outer wall echo.

11. The acoustic sensor system (1) according to claim 1, wherein the control unit is configured to determine a depth of a defect based on an attenuation of the ultrasonic echo which is proportional to the depth of the defect (2).

12. The acoustic sensor system (1) according to claim 1, comprising a single transceiver unit (4) configured to detect reflected ultrasound; and a plurality of transceiver units (4) arranged around the single transceiver unit (4) and each configured to emit ultrasound.

13. The acoustic sensor system (1) according to claim 1, wherein the second transceiver unit (4) is formed by a one-piece ring at its ultrasound exit surface and an ultrasound entrance surface of the first transceiver unit (4) is arranged inside the ring.

14. The acoustic sensor system (1) according to claim 1, comprising a plurality of transceiver units (4), wherein ultrasonic exit and entrance surfaces of the transceiver units (4) are arranged circularly.

15. An inline inspection device, ILI, for inspecting a pipeline wall (3), comprising one or more acoustic sensor system(s) (1) according to claim 1.

16. A method for detecting a defect (2) of a pipeline wall (3), comprising the following steps:

operating (S100) the at least one transceiver unit (4) of claim 1 to emit ultrasound in the direction of the pipeline wall (3) and to detect an ultrasound echo reflected from the pipeline wall (3); and operating (S200) the control unit (5) of claim 1 signally connected to the at least one transceiver unit (4) to detect the defect (2) of the pipeline wall (3) on the basis of an occurring change in the ultrasound echo.

17. The method for detecting a defect (2) of a pipeline wall (3) according to claim 16, further comprising the step of transmitting a computer program with a data carrier signal.

18. The acoustic sensor system (1) according to claim 13, wherein the ultrasound entrance surface of the first transceiver unit (4) is arranged concentrically inside the ring.

* * * * *